(12) United States Patent
Amis et al.

(10) Patent No.: US 9,712,423 B1
(45) Date of Patent: Jul. 18, 2017

(54) ROUTING PROTOCOL FOR AN INTERCONNECTION NETWORK

(75) Inventors: Alan D. Amis, Plano, TX (US); James A. Stevens, Lucas, TX (US); Jeffrey D. Johnson, Sachse, TX (US); Serge P. Lussier, Richardson, TX (US); Ian P. Difranco, Rowlett, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 283 days.

(21) Appl. No.: 12/891,203

(22) Filed: Sep. 27, 2010

(51) Int. Cl.
*H04L 12/751* (2013.01)
*H04L 12/733* (2013.01)

(52) U.S. Cl.
CPC .............. *H04L 45/02* (2013.01); *H04L 45/20* (2013.01)

(58) Field of Classification Search
CPC ....... G06F 15/173; H04L 12/28; H04L 45/02; H04L 45/04; H04L 45/20; H04L 45/22; H04L 45/48; H04L 45/54; H04W 40/248; H04W 40/246
USPC ........ 370/254, 351, 355, 389, 395.1–391.32, 370/400, 409
See application file for complete search history.

(56) References Cited

U.S. PATENT DOCUMENTS

| | | | | |
|---|---|---|---|---|
| 5,572,512 A * | 11/1996 | Cutler et al. | .................. | 370/248 |
| 7,007,102 B2 * | 2/2006 | Billhartz et al. | .............. | 709/238 |
| 7,281,057 B2 * | 10/2007 | Cain | .............................. | 709/238 |
| 7,990,893 B1 * | 8/2011 | Singh | ............................ | 370/254 |
| 2003/0026268 A1 * | 2/2003 | Navas | ........................... | 370/400 |
| 2004/0143842 A1 * | 7/2004 | Joshi | ..................... | H04W 24/00 725/32 |
| 2006/0029001 A1 * | 2/2006 | Mensch et al. | ............... | 370/254 |
| 2010/0281163 A1 * | 11/2010 | Shi et al. | ...................... | 709/224 |
| 2011/0044351 A1 * | 2/2011 | Punati et al. | ................. | 370/408 |

FOREIGN PATENT DOCUMENTS

EP 2230802 A1 * 9/2010

OTHER PUBLICATIONS

NPL1 (Title: Routing in Ad-Hoc Networks using Minimum Connected Dominating Sets; by Das et al, IEEE 1997).*

(Continued)

*Primary Examiner* — Ruolei Zong
(74) *Attorney, Agent, or Firm* — Angel N. Gerdzhikov; Donna P. Suchy; Daniel M. Barbieri

(57) ABSTRACT

A node for connecting to an interconnection network may include a network interface. The node may also include a processor coupled with the network interface. The node may further include a memory coupled with the processor. The processor may be configured for periodically analyzing the connectedness of the node to the interconnection network to determine a metric for the node in relation to other nodes within the interconnection network. The node may be designated as a member of a core set of nodes within the interconnection network based upon the metric. The node may detect at least one of a derived update or an update indicating another node connects to or disconnects from the interconnection network. The node may transmit a routing update to another member of the core set of nodes only when the node is designated as part of the core set of nodes.

20 Claims, 3 Drawing Sheets

(56) References Cited

OTHER PUBLICATIONS

Tao Lin, "Mobile Ad-hoc Network Routing Protocols: Methodologies and Applications," 2004, Virginia Polytechnic Institute and State University, PhD Dissertation, https://theses.lib.vt.edu/theses/available/etd-03262004-144048/unrestricted/Tao_PhD_Dissertation.pdf.*

Tao Lin, "Mobile Ad-hoc Network Routing Protocols: Methodologies and Applications," 2004, Virginia Polytechnic Institute and State University, PhD Dissertation, https://theses.lib.vt.edu/theses/available/etd-03262004-144048/unrestricted/Lin_PhD_Dissertation.pdf.*

B. Das and V. Bhargavan, "Routing in ad-hoc networks using minimum connected dominating sets," 1997, IEEE, in Proc. of IEEE International Conference on Communications, vol. 1, pp. 376-380, http://ieeexplore.ieee.org/xpls/abs_all.jsp?arnumber=605303.*

Bhargav R. Bellur et al., "An Ad-hoc Network for Teams of Autonomous Vehicles," Jul. 2002, www.cains.cs.ucla.edu, http://www.cains.cs.ucla.edu/ains2002/resource/bellur.pdf.*

Zhu Han et al., "Smart Deployment/Movement of Unmanned Air Vehicle to Improve Connectivity in MANET," May 2006, sig.umd.edu, sig.umd.edu/publications/Han_WCNC_200604.pdf.*

F. Baker, An outsider's view of MANET, Internet Engineering Task Force (IETF) Manet Working Group, Internet Draft, Mar. 17, 2002, 36 pages.

Hamid Gharavi, Multichannel Mobile Ad Hoc Links for Multimedia Communications, Proceedings of the IEEE, vol. 96, No. 1, 20 pages, Jan. 2008.

Jielin and Dong, Mobile Ad Hoc Network, Network Dictionary, Javvin Technologies, Inc., Mar. 1, 2007, p. 314.

Jielin and Dong, MANET, Network Dictionary, Javvin Technologies, Inc., Mar. 1, 2007, p. 300.

Lee et al., Efficient Peer-to-Peer File Sharing Using Network Coding in MANET, Journal of Communications and Networks, vol. 10, No. 4, Dec. 2008, p. 422-429.

Mobile ad hoc network, Wikipedia, found online at <https://en.wikipedia.org/w/index.php?title=Mobile_ad_hoc_network&oldid=308107014>, Nov. 5, 2015, 4 pages.

* cited by examiner

ROUTING PROTOCOL FOR AN INTERCONNECTION NETWORK

TECHNICAL FIELD

The present disclosure generally relates to the field of computer networking, and more particularly to a device, system, and method for implementing a network protocol establishing a core set of nodes for transmitting routing table updates.

BACKGROUND

An interconnection network may include a group of computers and/or other devices interconnected by communications channels to facilitate communication among users. Interconnection networks may also allow users to share resources. One type of interconnection network is a mesh network. A mesh network allows for continuous connections and reconfiguration around broken or blocked paths, by allowing network traffic to hop from node to node until the destination is reached.

SUMMARY

A node for connecting to an interconnection network may include a network interface for communicating with at least a second node within the interconnection network. The node may also include a processor coupled with the network interface. The processor may be configured for executing control programming for periodically analyzing the connectedness of the node to the interconnection network to determine at least one metric regarding at least one characteristic of the node in relation to other nodes within the interconnection network. The processor may also be configured for designating the node as a member of a core set of nodes within the interconnection network based upon the at least one metric regarding the connectedness of the node. The processor may further be configured for detecting at least one of a derived update or an update indicating the second node at least one of connects to or disconnects from the interconnection network. The processor may also be configured for updating a list including a first set of nodes connected to the node to at least one of include the second node when the second node connects to the interconnection network or to exclude the second node when the second node disconnects from the interconnection network. The processor may further be configured for transmitting a routing update including the list of the first set of nodes to another member of the core set of nodes only when the node is designated as part of the core set of nodes. The node may also include a memory coupled with the processor for storing the list including the first set of nodes.

A method for implementing a network protocol establishing a core set of nodes for transmitting routing table updates is described. The method may include periodically analyzing the connectedness of a node to an interconnection network to determine at least one metric regarding at least one characteristic of the node in relation to other nodes within the interconnection network. The method may also include designating the node as a member of a core set of nodes within the interconnection network based upon the at least one metric regarding the connectedness of the node. The method may further include detecting at least one of a derived update or an update indicating a second node at least one of connects to or disconnects from the interconnection network. The method may also include updating a list including a first set of nodes connected to the node to at least one of include the second node when the second node connects to the interconnection network or to exclude the second node when the second node disconnects from the interconnection network. The method may further include transmitting a routing update including the list of the first set of nodes to another member of the core set of nodes only when the node is designated as part of the core set of nodes.

A system may include an interconnection network having a number of nodes. Each node may include a network interface for communicating with at least a second node within the interconnection network. Each node may also include a processor coupled with the network interface. The processor may be configured for executing control programming for periodically analyzing the connectedness of the node to the interconnection network to determine at least one metric regarding at least one characteristic of the node in relation to other nodes within the interconnection network. The processor may also be configured for designating the node as a member of a core set of nodes within the interconnection network based upon the at least one metric regarding the connectedness of the node. The processor may further be configured for detecting at least one of a derived update or an update indicating the second node at least one of connects to or disconnects from the interconnection network. The processor may also be configured for updating a list including a first set of nodes connected to the node to at least one of include the second node when the second node connects to the interconnection network or to exclude the second node when the second node disconnects from the interconnection network. The processor may further be configured for transmitting a routing update including the list of the first set of nodes to another member of the core set of nodes only when the node is designated as part of the core set of nodes. Each node may also include a memory coupled with the processor for storing the list including the first set of nodes.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
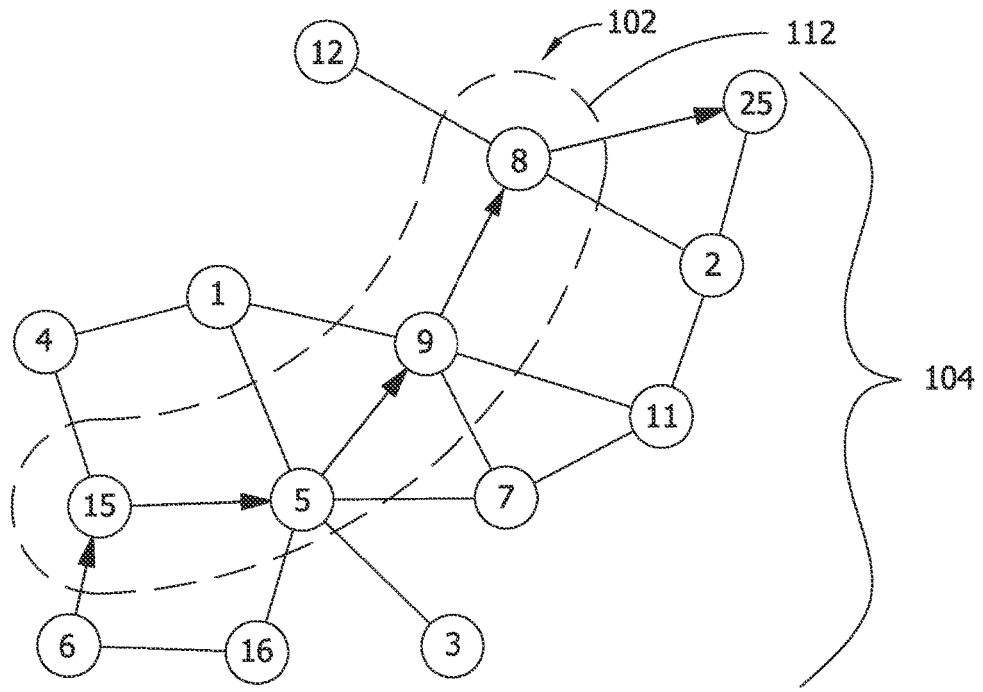
FIG. 1 is a schematic illustrating a mesh network including a core set of nodes, where a core node concentrator algorithm is utilized to transmit network traffic.
Figure 2:
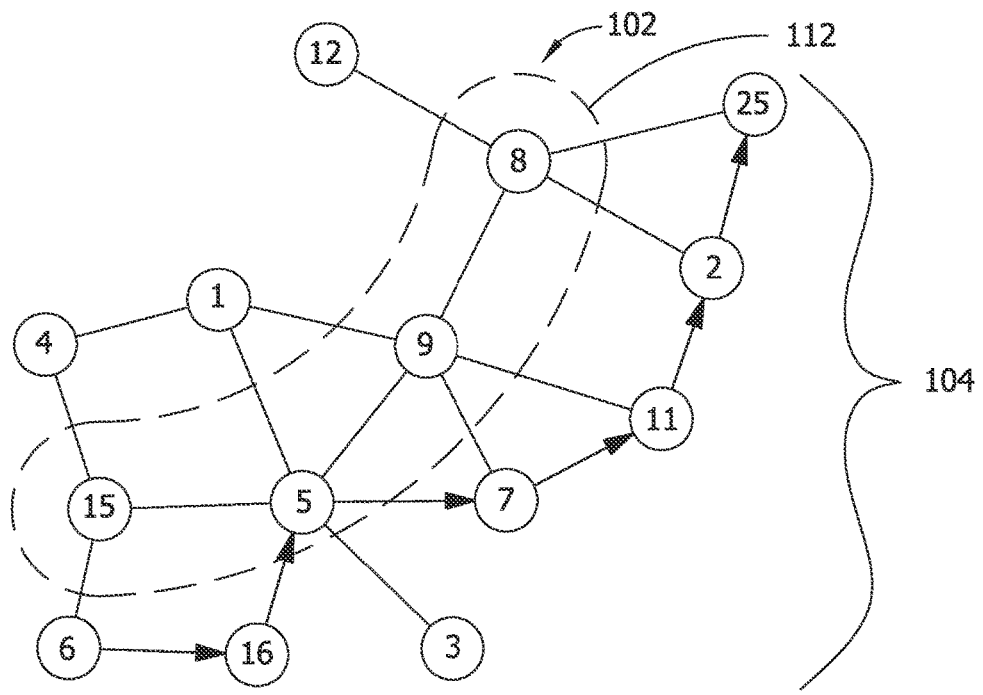
FIG. 2 is a schematic illustrating a mesh network including a core set of nodes, where a core node avoidance algorithm is utilized to transmit network traffic.
Figure 3:
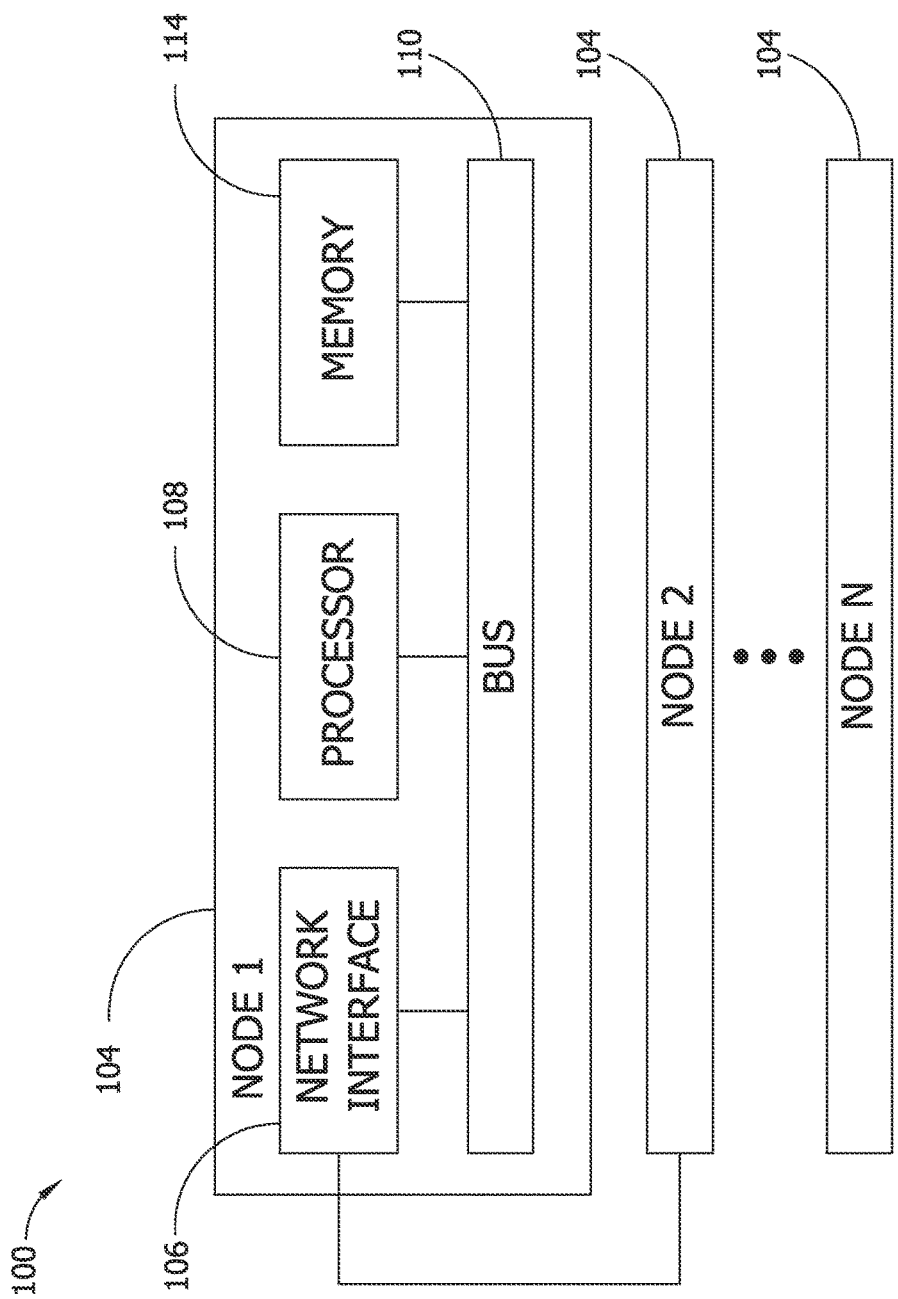
FIG. 3 is a block diagram illustrating a system including a set of nodes implementing a network protocol establishing a core set of nodes for transmitting routing table updates.

Reference will now be made in detail to the subject matter disclosed, which is illustrated in the accompanying drawings.

Referring generally to FIGS. 1 through 4, a system 100 including an interconnection network is described in accordance with the present disclosure. The interconnection network may include a dynamic network, such as a self-forming, wireless, mesh network 102 having thousands of nodes. In embodiments, the system 100 may provide low routing overhead properties and dynamic responsiveness for such a network. For example, the system 100 may provide desirable characteristics of a proactive routing protocol when implemented in a dynamic network, along with desirable characteristics of a reactive routing protocol when implemented in a static or virtually static network. Further, the system 100 may provide these desirable characteristics without switching between these two different proactive and reactive algorithms. Thus, in embodiments, the system 100 utilizes a routing protocol that may combine the fast convergence of link state routing with the low packet overhead of distance vector routing.

The mesh network 102 connects nodes 104 together, forming a community of nodes for transmitting information. In embodiments, the nodes 104 include computers and/or other devices for processing information, such as an airborne communication device, an avionics communication device, a ground-based device, a water-based device, a munitions projectile, an Unmanned Aircraft Vehicle (UAV), a Tactical Targeting Network Technology (TTNT) device, a Wideband Networking Waveform (WNW)/Ground Mobile Radio (GMR) device, a FlexNet device, an ARC-210 transceiver radio waveform device as manufactured by Rockwell Collins, Inc., or the like. Each node 104 for connecting to the mesh network 102 may include a network interface 106 for communicating with one or more additional nodes within the mesh network 102. Further, each node may include a processor 108 coupled with the network interface 106. In embodiments, the processor may be configured for executing control programming to control the behavior of the node 104 within the mesh network 102. The processor 108 may be connected to the network interface 106 via a bus 110.

Within the system 100, some nodes are designated as part of a set or core nodes, (e.g., a minimum Connected Dominating Set (CDS) of nodes 112), while other nodes are not designated as part of the minimum CDS of nodes 112. In embodiments, only nodes that are part of the minimum CDS of nodes 112 may send routing updates. Other nodes in the mesh network 102 that are not part of the minimum CDS of nodes 112 may then passively listen and update their routing tables based on route updates transmitted/broadcast by the minimum CDS of nodes 112. For example, nodes that are not part of the minimum CDS of nodes 112 may listen to the routing updates broadcast by the minimum CDS of nodes 112. These nodes then update their routing tables to be consistent with the minimum CDS of nodes 112.

Further, nodes that are part of the minimum CDS of nodes 112 update their routing tables based on detected updates, such as routing updates and/or neighbor reports transmitted via other neighboring core nodes (e.g., via a routing update and/or a neighbor report from a member of the minimum CDS of nodes 112), as well as detected updates, such as neighbor reports of neighboring non-core nodes (e.g., via a neighbor report from a node that is not part of the minimum CDS of nodes 112). Alternatively, nodes that are part of the minimum CDS of nodes 112 may update their routing tables based on detected derived updates, such as the absence of a routing update/neighbor report from a previously connected node. For example, a derived update may include detecting that a previously connected node has not transmitted a routing update/neighbor update for some period of time and/or some number of communication cycles.

In some embodiments, the system 100 may utilize a distance vector protocol operating with a single CDS serving the entire network. Thus, the path connecting the core set of nodes forms a CDS backbone utilized for transmitting routing updates. Further, in some embodiments, modifications may be made to a distance vector route update to include a "next hop" field for each destination node in the routing update. For example, referring to FIG. 2, the next hop for node 25 when routing from node 16 would be node 5. When routing user traffic, the algorithm will attempt to avoid members of the CDS nodes as the next hop, when possible. This may allow user traffic to be distributed throughout the network, avoiding a concentration of traffic flow that could result in network congestion.

The control programming executed by the processor 108 of each node 104 periodically analyzes the connectedness of each node to the mesh network 102 to determine at least one metric regarding a characteristic of the node 104 in relation to other nodes within the mesh network 102. In some embodiments, the metric regarding the characteristic of the node 104 includes its distance from the set of nodes that are part of the minimum CDS of nodes 112. Alternatively, a node may analyze its degree of connectivity to the mesh network 102. In other embodiments, a node may analyze its bandwidth for transmitting information within the mesh network 102. It will be appreciated that a variety of characteristics may be analyzed to determine metrics for the various nodes, including combinations of the aforementioned metrics, as well as other metrics regarding the mesh network 102. Further, a metric for a node may include a characteristic for another node, such as the bandwidth of a neighbor node, or the like. It will be appreciated that in a case where the metric for one node is the same for another node, a tiebreaker may be utilized, such as a numerical value identifying a node, or a number of resources available to a node.

The control programming executed by the processor 108 of each node 104 designates a node 104 as a member of the minimum CDS of nodes 112 within the mesh network 102 based upon the metric regarding the connectedness of the node 104. For example, in embodiments, each node in the mesh network 102 makes a self-determination to become a member of the network minimum CDS of nodes 112. The control programming may utilize a number of different metrics and/or algorithms for determining whether a node become a member of the core set of nodes including a minimum CDS algorithm, and a Spine algorithm. In embodiments, any node 104 may be required to become a core node and should be ready to assume the role of a member of the minimum CDS of nodes 112 immediately. Further, in embodiments, each node is a member of the minimum CDS of nodes 112 or is one hop away from the minimum CDS of nodes 112.

In some embodiments, a node designates itself as a member of the minimum CDS of nodes 112 when it has a high degree of connectivity within the mesh network 102. In other embodiments, nodes having a lower bandwidth for transmitting information within the mesh network 102 may be designated as members of the minimum CDS of nodes 112. It will be appreciated that the number of core nodes in the network may be a function of the network density. Further, the network density may be a function of the communications range of the radio. Additionally, the fewer the number of core nodes, the less the routing overhead. Thus, for a relatively dense network the number of core nodes may be very few. However, if a network is more sparsely connected, the number of core nodes may be larger. In some specific implementations, the system 100 may have a number of core nodes between about 10 and 20 percent of the number of nodes in the network, dependent upon network topology and possibly achievable assuming a network connectivity of approximately 60 percent.

In embodiments, the control programming is configured for relinquishing a node 104 from the minimum CDS of nodes 112. For example, another node may make a better candidate for the minimum CDS of nodes 112 based upon an identified characteristic regarding its connectedness to the mesh network 102 in relation to other nodes. Further, if a node does not elect itself at one point in time, at another subsequent point in time, the node may be elected by another node in the network. For example, in embodiments, the metric regarding the characteristic of the node 104 in relation to other nodes within the mesh network 102 may include an election of the node 104 to the minimum CDS of nodes 112 from another node within the mesh network 102.

The control programming executed by the processor 108 of each node 104 detects at least one of a derived update or an update indicating another node (e.g., a node connected to the node 104) connects to and/or disconnects from the mesh network 102. In some embodiments, the protocol for the network may operate with neighbor discovery as part of hello beacons. Alternatively, the protocol may operate above a separate MAC neighbor discovery, in which case the hello beacon may be minimal, only containing local neighbor nodes that are members of the CDS.

In embodiments, core nodes may transmit a Routing Sequence Number (RSN) with each routing update and retransmit the RSN with each subsequent Hello Beacon transmission. Other nodes receiving routing updates from these core nodes may then update their routing tables. All nodes, including core nodes, may transmit a hello beacon with a Neighbor Sequence Number (NSN) and may or may not transmit a neighbor report, depending on the MAC layer capabilities. Hello beacons may not include a neighbor report if there has been no change in the topology since the last hello beacon. If there has been a change in the topology since the last hello beacon, then an updated neighbor report may be included, and the NSN may be incremented. Sequence numbers may be utilized to ensure consistency of routing tables and neighbor reports. Neighboring nodes may solicit a routing update from a core node if the RSN is not consistent with the node's cached value. Further, a neighbor report may be solicited if the NSN is inconsistent.

The control programming executed by the processor 108 of each node 104 updates a list including neighbor nodes connected to the node 104 to include the second node when a neighbor node connects to the interconnection network, and to exclude the neighbor node when the neighbor node disconnects from the mesh network 102. In embodiments, the list including the neighbor nodes may be stored by a memory 114 coupled with the processor 108, or the like. The memory 114 may be connected to the processor 108 via the bus 110.

The control programming executed by the processor 108 of each node 104 transmits a routing update including the list of its neighbor nodes to another member of the minimum CDS of nodes 112 only when the node 104 is designated as part of the minimum CDS of nodes 112. In embodiments, the routing protocol may be topology triggered, only transmitting routing updates when there has been a change in the network topology. When the network remains static, then no routing updates are transmitted. Further, routing updates may only be propagated as far as the topology change is effective in the routing table. Thus, a route update may be squelched and not retransmitted once it no longer changes the routing table. Additionally, routing updates may not include a complete routing table, but may be specific to a subset/neighborhood of nodes within the network.

When utilized to determine a topology change, the hello beacon (as previously described) may be transmitted with no neighbor information and a sequence number of the last neighbor report transmission. Nodes may then solicit a neighbor update from a neighboring node if a previous neighbor report is interfered with or corrupted. The network protocol may utilize a typical distance vector with a field added to indicate the next hop to a particular destination. This may allow for flexible routing depending on the type of MAC layer protocol, Time Division Multiple Access (TDMA), Statistical Priority-based Multiple Access (SPMA), or others. Including the next hop to a destination node in the routing table may allow non-core neighboring nodes to determine how best to route to the destination. Thus, the core node backbone may be utilized as a transmission concentrator and/or distributor. For many TDMA slotted MAC/subnets, it may be desirable to concentrate transmissions through the same links to maximize the TDMA scheduling, as shown in FIG. 1. These routing decisions may favor transmissions through the core node backbone.

In specific implementations, the network protocol may operate as a subnet layer routing protocol below an Internet Protocol (IP) layer (e.g., assuming one radio interface to all neighbors). Subnet routing may interact with IP via an intermediate interfacing protocol, such as Border Interior Routing Protocol (BIRP) or Radio Open Shortest Path First (ROSPF) protocol. These protocols may solicit and update the IP routing tables, further reducing the routing overhead of higher layer protocols.

From the perspective of layer 3 routing, every node in the MANET is one hop away from each other, even though they may be multiple hops apart. As a packet is passed down the stack to the subnet layer, the protocol routes the packet properly through the MANET. Moreover, as the subnet routing learns of new links to the Internet and Global Information Grid (GIG), these links may be propagated through and updated in the subnet and IP routing tables.

In some embodiments, the network protocol may utilize a Link-Cluster Algorithm (LCA). Further, in embodiments, the network protocol may transmit information including routing information for two hops or further. In these implementations, the same number of CDS nodes may be utilized, but may not have to update link state visibility. This may reduce triggers/dynamics within the network.

Figure 4:
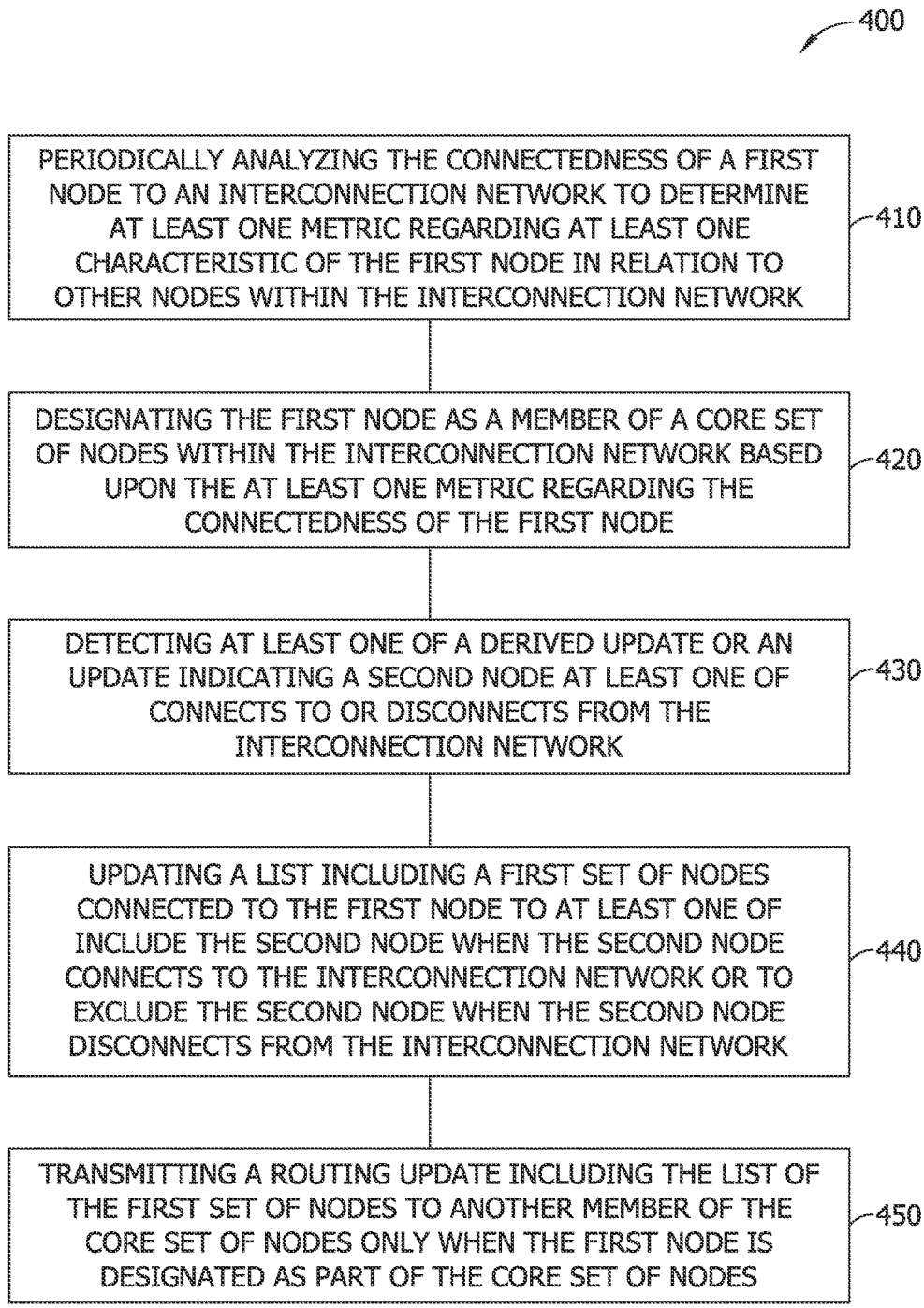
FIG. 4 is a method diagram illustrating a method for implementing a network protocol establishing a core set of nodes for transmitting routing table updates.

Referring now to FIG. 4, a method for implementing a network protocol establishing a core set of nodes for transmitting routing table updates is described. The method includes periodically analyzing the connectedness of a node to an interconnection network to determine at least one metric regarding at least one characteristic of the node in relation to other nodes within the interconnection network, 410. The method also include designating the node as a member of a core set of nodes within the interconnection network based upon the at least one metric regarding the connectedness of the node, 420. The method further includes detecting at least one of a derived update or an update indicating a second node at least one of connects to or disconnects from the interconnection network, 430. The method also includes updating a list including a first set of nodes connected to the node to at least one of include the second node when the second node connects to the interconnection network or to exclude the second node when the second node disconnects from the interconnection network, 440. The method further includes transmitting a routing update including the list of the first set of nodes to another member of the core set of nodes only when the node is designated as part of the core set of nodes.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A node for connecting to an interconnection network, the node comprising:
    a network interface for communicating with at least a second node within the interconnection network, wherein the interconnection network is a mobile ad-hoc network;
    a processor coupled with the network interface, the processor configured for executing control programming for:
        periodically analyzing connectedness of the node to the interconnection network to determine at least one metric regarding at least one characteristic of the node in relation to other nodes within the interconnection network, wherein the at least one metric regarding the at least one characteristic includes a bandwidth of the node in relation to a bandwidth of a neighboring node, a degree of connectivity to the interconnection network, and a distance from the node to a single core set of nodes;
        self-determining the node to be a member of the single core set of nodes within the interconnection network based upon the at least one metric regarding the connectedness of the node, the single core set of nodes being a minimum connected dominating set of nodes, the single core set of nodes including some nodes of the interconnection network while not including other nodes of the interconnection network, wherein a path connecting the single core set of nodes forms a backbone for transmitting routing updates, wherein each node of the interconnection network is no more than one hop away from the single core set of nodes, wherein only nodes of the minimum connected dominating set send routing updates;
        detecting an update indicating that at least the second node has connected to the interconnection network, wherein the update detected by the node is transmitted via at least one of a routing update from a member of the single core set of nodes or from a neighbor report from a member of the single core set of nodes;
        updating a list including a first set of nodes connected to the node to include the at least the second node when the at least the second node connects to the interconnection network;
        determining that a change to a topology of the interconnection network has occurred; and
        transmitting a routing update including the list of the first set of nodes to another node only if the other node is designated as being a member of the single core set of nodes, the list of the first set of nodes of the routing update including information specific to a subset of nodes within the mobile ad-hoc network, wherein transmitting the routing update is performed upon the determination that the change to the topology of the interconnection network has occurred, wherein the routing update transmitted by the node is transmitted according to a distance vector protocol and includes a next hop field for each destination node in the routing update, wherein the routing update routes network traffic to avoid nodes of the single core set of nodes when a path through one or more non-core nodes is available so as to reduce a concentration of network traffic through the single core set of nodes; and
    a memory coupled with the processor for storing the list including the first set of nodes.

2. The node of claim 1, wherein the node is or includes an airborne communication device, an avionics communication device, a ground-based mobile device, a water-based mobile device, a munitions projectile, or an Unmanned Aircraft Vehicle (UAV).

3. The node of claim 1, wherein the control programming is further configured for:
    determining that a further change to the topology of the interconnection network has occurred;
    determining whether to relinquish the node's own membership in the single core set of nodes upon determining that the further change to the topology of the interconnection network has occurred; and
    relinquishing the node's own membership in the single core set of nodes upon a determination to relinquish the node's own membership in the single core set of nodes.

4. The node of claim 1, wherein the at least one metric regarding the at least one characteristic of the node in relation to other nodes within the interconnection network includes an election of the node to the single core set of nodes from another node within the interconnection network.

5. A method for connecting to an interconnection network, comprising:
    periodically, by at least one processor of a node, analyzing connectedness of the node to an interconnection network to determine at least one metric regarding at least one characteristic of the node in relation to other nodes within the interconnection network, wherein the interconnection network is a mobile ad-hoc network, wherein the at least one metric regarding the at least one characteristic includes a bandwidth of the node in relation to a bandwidth of a neighboring node, a degree of connectivity to the interconnection network, and a distance from the node to a single core set of nodes;
    self-determining, by the at least one processor of the node, the node to be a member of the single core set of nodes within the interconnection network based upon the at least one metric regarding the connectedness of the node, the single core set of nodes being a minimum connected dominating set of nodes, wherein a path connecting the single core set of nodes forms a backbone for transmitting routing updates, the single core set of nodes including some nodes of the interconnection network while not including other nodes of the interconnection network, wherein each node of the interconnection network is no more than one hop away from the single core set of nodes, wherein only nodes of the minimum connected dominating set send routing updates;

detecting, by the at least one processor of the node, at least one derived update indicating that at least a second node has disconnected from the interconnection network based on failing to receive at least one routing or neighbor update from the at least one second node within a predetermined period of time or a predetermined number of communication cycles;

updating, by the at least one processor of the node, a list including a first set of nodes connected to the node to exclude the at least the second node when the at least the second node disconnects from the interconnection network;

determining, by the at least one processor of the node, that a change to a topology of the interconnection network has occurred; and transmitting a routing update including the list of the first set of nodes to another node only if the other node is designated as being a member of the single core set of nodes, the list of the first set of nodes of the routing update including information specific to a subset of nodes within the mobile ad-hoc network, wherein transmitting the routing update is performed upon the determination that the change to the topology of the interconnection network has occurred, wherein the routing update routes network traffic to avoid nodes of the single core set of nodes when a path through one or more non-core nodes is available so as to reduce a concentration of network traffic through the single core set of nodes.

6. The method of claim 5, wherein the routing update transmitted by the node is transmitted according to a distance vector protocol and includes a next hop field for each destination node in the routing update.

7. The method of claim 5, further comprising:
determining that a further change to the topology of the interconnection network has occurred;
determining whether to relinquish the node's own membership in the single core set of nodes upon determining that the further change to the topology of the interconnection network has occurred; and
relinquishing the node's own membership in the single core set of nodes upon a determination to relinquish the node's own membership in the single core set of nodes.

8. The method of claim 5, wherein the at least one metric regarding the at least one characteristic of the node in relation to other nodes within the interconnection network includes an election of the node to the single core set of nodes from another node within the interconnection network.

9. A system, comprising:
an interconnection network, the interconnection network being a self-forming and wireless mesh network, the interconnection network having a plurality of nodes, the plurality of nodes including a node and at least a second node, wherein each particular node of the plurality of nodes includes:
a network interface for communicating with at least a second node within the interconnection network;
a processor coupled with the network interface, the processor configured for executing control programming for:
periodically analyzing connectedness of the particular node to the interconnection network to determine at least one metric regarding at least one characteristic of the particular node in relation to other nodes within the interconnection network, wherein the at least one metric regarding the at least one characteristic includes a bandwidth of the node in relation to a bandwidth of a neighboring node, a degree of connectivity to the interconnection network, and a distance from the node to a single core set of nodes;
self-determining the particular node to be a member of the single core set of nodes within the interconnection network based upon the at least one metric regarding the connectedness of the particular node, the single core set of nodes being a minimum connected dominating set of nodes, wherein a path connecting the single core set of nodes forms a backbone for transmitting routing updates, the single core set of nodes including some nodes of the interconnection network while not including other nodes of the interconnection network, wherein each node of the interconnection network is no more than one hop away from the single core set of nodes, wherein only nodes of the minimum connected dominating set send routing updates;
detecting at least one of a derived update or an update indicating that at least the second node at least one of connects to or disconnects from the interconnection network;
updating a list including a first set of nodes connected to the particular node to at least one of include the at least the second node when the at least the second node connects to the interconnection network or to exclude the at least the second node when the at least the second node disconnects from the interconnection network;
determining that a change to a topology of the interconnection network has occurred; and
transmitting a routing update including the list of the first set of nodes to another node only if the other node is designated as being a member of the single core set of nodes, the list of the first set of nodes of the routing update including information specific to a subset of nodes within the self-forming and wireless mesh network, wherein transmitting the routing update is performed upon the determination that the change to the topology of the interconnection network has occurred, wherein the routing update routes network traffic to avoid nodes of the single core set of nodes when a path through one or more non-core nodes is available so as to reduce a concentration of network traffic through the single core set of nodes; and
a memory coupled with the processor for storing the list including the first set of nodes.

10. The system of claim 9, wherein the update detected by the node is transmitted via at least one of a routing update from a member of the single core set of nodes or from a neighbor report from a member of the single core set of nodes.

11. The system of claim 9, wherein the control programming is further configured for:
- determining that a further change to the topology of the interconnection network has occurred;
- determining whether to relinquish the node's membership in the single core set of nodes upon determining that the further change to the topology of the interconnection network has occurred; and
- relinquishing the node's membership in the single core set of nodes upon a determination to self-relinquish the node's membership in the single core set of nodes.

12. The system of claim 9, wherein the at least one metric regarding the at least one characteristic of the node in relation to other nodes within the interconnection network includes an election of the node to the single core set of nodes from another node within the interconnection network.

13. The method of claim 5, wherein each particular node of the interconnected network is configured to self-determine that the particular node is either a particular member of the single core set of nodes or within one hop of at least one member of the single core set of nodes.

14. The method of claim 5, further comprising:
- determining that a further change to the topology of the interconnection network has occurred;
- determining whether to elect any other nodes of the interconnected network for membership in the single core set of nodes upon a determination that the further change to the topology of the interconnection network has occurred;
- electing another node of the interconnected network for membership in the single core set of nodes;
- determining whether to relinquish the node's own membership in the single core set of nodes upon electing the other node of the interconnected network for membership in the single core set of nodes; and
- relinquishing the node's own membership in the single core set of nodes upon a determination to relinquish the node's own membership in the single core set of nodes based upon the identified characteristic;
- passively listening for any routing updates transmitted by any node of the single core set of nodes upon relinquishing the node's own membership in the single core set of nodes; and
- updating the node's routing tables based upon receipt of any routing updates through passively listening for any routing updates transmitted by any node of the single core set of nodes.

15. The method of claim 5, further comprising:
utilizing link state routing and distance vector routing.

16. The node of claim 1, wherein the at least one metric includes a distance from the single core set of nodes.

17. The node of claim 1, wherein the node is or includes an avionics communication device, a munitions projectile, or an Unmanned Aircraft Vehicle (UAV).

18. The method of claim 5, wherein the node is or includes an avionics communication device, a munitions projectile, or an Unmanned Aircraft Vehicle (UAV).

19. The system of claim 9, wherein at least one node of the plurality of nodes is or includes an avionics communication device or an Unmanned Aircraft Vehicle (UAV).

20. The node of claim 1, wherein the node is a munitions projectile.

* * * * *